United States Patent [19]
Carsten

[11] Patent Number: 5,929,692
[45] Date of Patent: Jul. 27, 1999

[54] RIPPLE CANCELLATION CIRCUIT WITH FAST LOAD RESPONSE FOR SWITCH MODE VOLTAGE REGULATORS WITH SYNCHRONOUS RECTIFICATION

[75] Inventor: Bruce W. Carsten, Corvallis, Oreg.

[73] Assignee: Computer Products Inc., Fremont, Calif.

[21] Appl. No.: 08/890,385

[22] Filed: Jul. 11, 1997

[51] Int. Cl.[6] .................................................. H01J 19/82
[52] U.S. Cl. ........................ 327/531; 327/551; 327/558; 323/271; 323/282
[58] Field of Search .................................. 323/271, 272, 323/282; 327/175, 177, 323, 332, 531, 532, 551, 558

[56] References Cited

U.S. PATENT DOCUMENTS

| | | | |
|---|---|---|---|
| 5,559,463 | 9/1996 | Denker et al. ........................... | 327/177 |
| 5,592,071 | 1/1997 | Brown ...................................... | 323/282 |
| 5,668,466 | 9/1997 | Vinciarelli et al. ...................... | 323/282 |
| 5,677,618 | 10/1997 | Fiez et al. ................................ | 323/282 |
| 5,770,940 | 6/1998 | Goder ...................................... | 323/282 |

OTHER PUBLICATIONS

S. Cuk et al., "Analysis of Integrated Magnetics to Eliminate Current Ripple in Switching Converters", PCI Apr. 1983 Proceedings, pp. 361–386.
H. Ertl et al., "A New 1kW Class–D Supported Linear Power Amplifier Employing a Self–Adjusting Ripple Cancellation Scheme", Power Conversion, May 1996 Proceedings, pp. 265–274.
H. Ertl et al., "A Novel Switch–Mode Power Amplifier with High Output Voltage Quality Employing a Hybrid Output Voltage Filter", Power Conversion, Jun. 1997 Proceedings, pp. 419–428.
B. Jacobson, "Design of Multiphase DC/DC Converters", HFPC Power Conversion, Sep. 1996, Proceedings, pp. 7–18.
J. Kolar et al., "Novel 'Zero'–Ripple Cuk and SEPIC Conventer Topoligies Requiring No Coupling of Input and Output Inductors", Power Conversion, Jun. 1997 Proceedings, pp. 91–103.
J. Marrero, "Utilizing Ripple Steering in Forward and Flyback Converters and Input Filters", HFPC, May 1995 Proceedings, pp. 158–172.
H. Martin et al., "Improved Multi–Phase Coupled Inductor Topologies", HFPC, May 1992 Proceedings, pp. 340–349.
R. Middlebrook, "Reduction of Switching Ripple in Power Converters", PCI Apr. 1983 Proceedings, pp. 6–14.
J. Wang et al., "Ripple–Free Input Current Boost Converter with Discontinuous Inductor Current Mode", HFPC Power Conversion, Sep. 1996 Proceedings, pp. 211–224.

*Primary Examiner*—Timothy P. Callahan
*Assistant Examiner*—Jung Ho Kim
*Attorney, Agent, or Firm*—Skjerven, Morrill, MacPherson, Franklin & Friel LLP; Michael J. Halbert

[57] ABSTRACT

A switch mode voltage regulator with synchronous rectification that produces ripple cancellation with fast load response is described. The switch mode voltage regulator comprises a main step-down regulator with synchronous rectification with an auxiliary step-down regulator that produces an output ripple cancellation current that is equal but opposite to the output ripple of the main regulator during static load conditions. During changing load conditions a feedback control circuit changes the duty cycle of the main regulator while a time-delay circuit prevents a change of the duty cycle in the auxiliary regulator. Thus, the main regulator is allowed to change its average current while preventing a counteracting average current change in the auxiliary regulator. An embodiment is described in which the duty cycle in the auxiliary regulator is changed in phase with the duty cycle of main regulator to further improve the dynamic response to load changes. A sub-cycle circuit is also described that overrides the feedback control circuit to improve the dynamic response to load changes. Accordingly, a fast transient response can be achieved with a switch mode regulator that has a low ripple voltage.

28 Claims, 11 Drawing Sheets

RIPPLE CANCELLATION CIRCUIT WITH FAST LOAD RESPONSE FOR SWITCH MODE VOLTAGE REGULATORS WITH SYNCHRONOUS RECTIFICATION

FIELD OF THE INVENTION

This invention relates to switch mode voltage regulators. In particular this invention relates to step-down voltage regulators with low output voltage ripple and a fast response to changes in load conditions.

BACKGROUND OF THE INVENTION

Low output voltage ripple and a fast response to changes in load conditions are two desirable but conflicting attributes for switch mode voltage regulators. FIG. 1 is a simplified schematic diagram of a step-down switch mode regulator 10 with synchronous rectification. Step-down regulator 10 includes input terminals 12a, 12b across which input voltage $V_{IN}$ is applied; an input filter 13, field-effect transistors ("FETs") 14 and 16; an inductor 18; a capacitor 20; output terminals 22a and 22b, which provide an output voltage $V_{OUT}$ where $V_{OUT}<V_{IN}$; and a feedback control circuit 24 to control the duty cycle of transistors 14 and 16. The duty cycle of transistors 14 and 16 is maintained such that either transistor 14 or transistor 16 is on, but due to inverter 26 both are not on simultaneously. FIG. 2 illustrates the current and voltage waveforms for step-down regulator 10. Control circuit 24 regulates $V_{OUT}$ by maintaining a duty cycle as illustrated by curves showing the on and off times for $FET_{14}$ and $FET_{16}$. The current flowing through inductor 18 is illustrated by curve $I_{18}$ and the voltage at node 28, which fluctuates from $V_{IN}$ to circuit common, is illustrated by curve $V_{28}$. Thus, regulator 10 produces a voltage $V_{OUT}$ with a ripple as shown in FIG. 2.

Obtaining a low output ripple typically involves the use of a large filter inductor and/or a large filter capacitor, or the use of multi-stage filters. Although these approaches reduce output ripple, a large filter inductor or multi-state filter reduces the speed with which the regulator can respond to large changes in the output load current. A large filter inductor limits the current slew rate, and each filter stage adds a response time delay affecting the control circuit performance. In addition, a large filter capacitor is expensive and adds substantially to the size and weight of the device.

"Active" filters using linear circuitry can be used in principle to reduce ripple without adversely affecting the response speed to changes in the load current. However, if the original ripple is high, the power loss in an active filter is excessive thereby offsetting the efficiency advantages of switch mode regulation.

SUMMARY

A switch mode voltage regulator with synchronous rectification in accordance with the present invention produces an output voltage with ripple cancellation and a fast response to load changes. The switch mode voltage regulator comprises a main step-down regulator with synchronous rectification and an auxiliary step-down regulator that produces an output ripple current that is equal but opposite to the ripple current in the output of the main regulator during static load conditions. Thus, the two ripple currents cancel and the switch mode voltage regulator of the present invention achieves a low ripple output voltage without using large inductor or capacitor values. During transient load conditions, a feedback control circuit changes the duty cycle of the main regulator to provide a forcing voltage to the main inductor to slew the current to its new value. In one embodiment of the invention a time-delay circuit prevents a corresponding change of the duty cycle in the auxiliary regulator, thus, preventing a counteracting current change from the auxiliary regulator. This allows the regulator to quickly respond to changes in load conditions.

In another embodiment of the invention, the feedback control circuit changes the duty cycle switching of the auxiliary regulator to be in phase with the main regulator. This causes the current of the auxiliary regulator to add to the main regulator and increases the dynamic response to load changes. In yet another embodiment, a sub-cycle control circuit may be used to override the feedback control circuit and further increase the dynamic response to load changes of the regulator. Accordingly, a fast transient response can be achieved with a switch mode regulator that has a low output ripple voltage without the need for a large filter inductor, large filter capacitor, or multi-stage filters.

DETAILED DESCRIPTION

Output Ripple Cancellation

Figure 1:
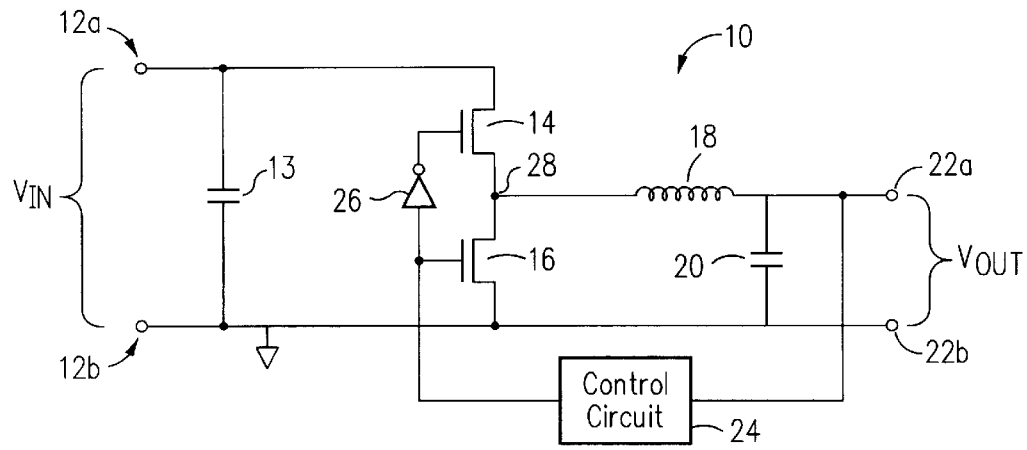
FIG. 1 is a circuit diagram of a step-down regulator with synchronous rectification.
Figure 2:
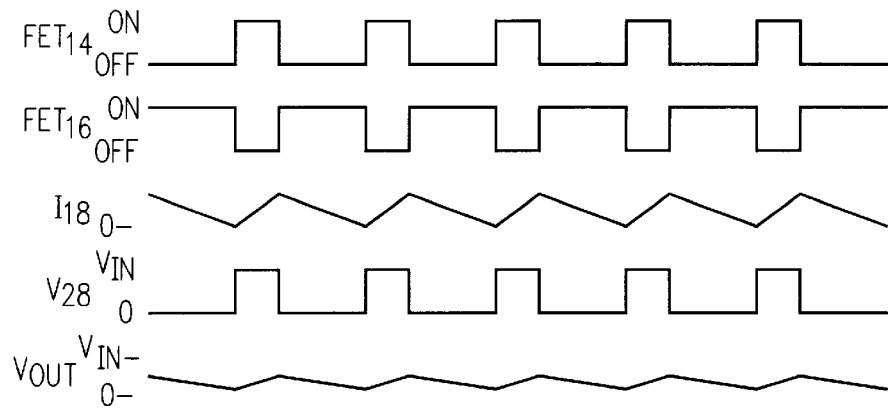
FIG. 2 is a waveform diagram illustrating operation of the step-down regulator of FIG. 1.
Figure 3:
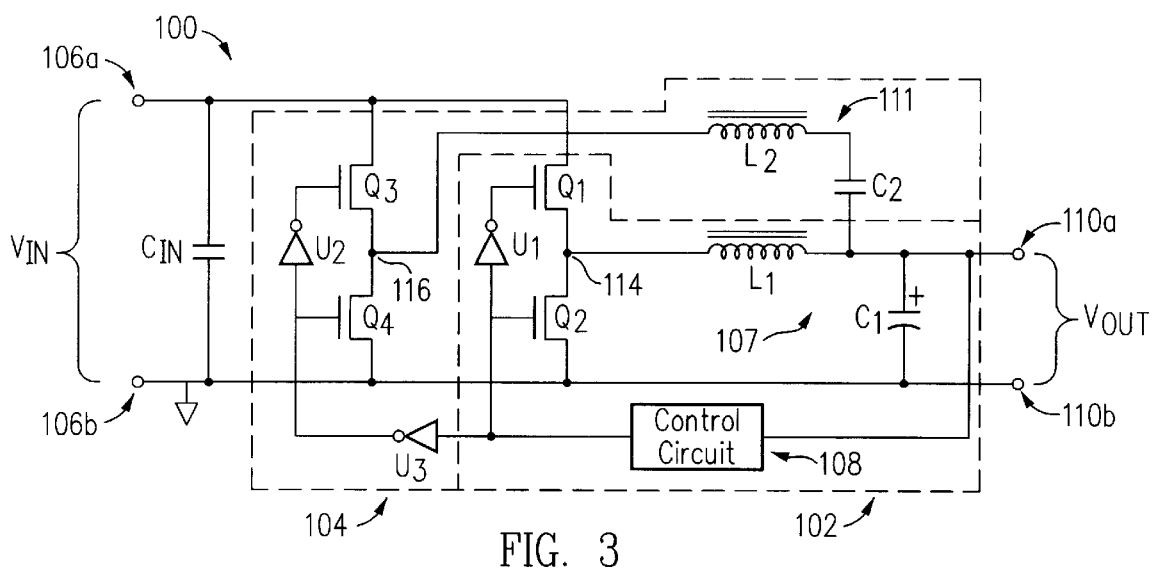
FIG. 3 is a circuit diagram of a switch mode voltage regulator with synchronous rectification and output ripple cancellation in accordance with the present invention.

FIG. 3 is a simplified diagram of a switch mode step-down voltage regulator 100 with output ripple cancellation including a main circuit 102 and an auxiliary circuit 104.

Input DC voltage $V_{IN}$ is received at terminals 106a, 106b and is applied to an input filter $C_{IN}$ and to N channel field-effect transistors ("FETs") Q1 and Q2, which are used as the active switch and synchronous rectifier, respectively, in the "chopper" portion in main circuit 102. As an alternative, P channel FETs may be used or other switching devices may be used, e.g., substituting a diode with the anode coupled to circuit common node in lieu of the synchronous rectifier FET Q2.

Figure 5:
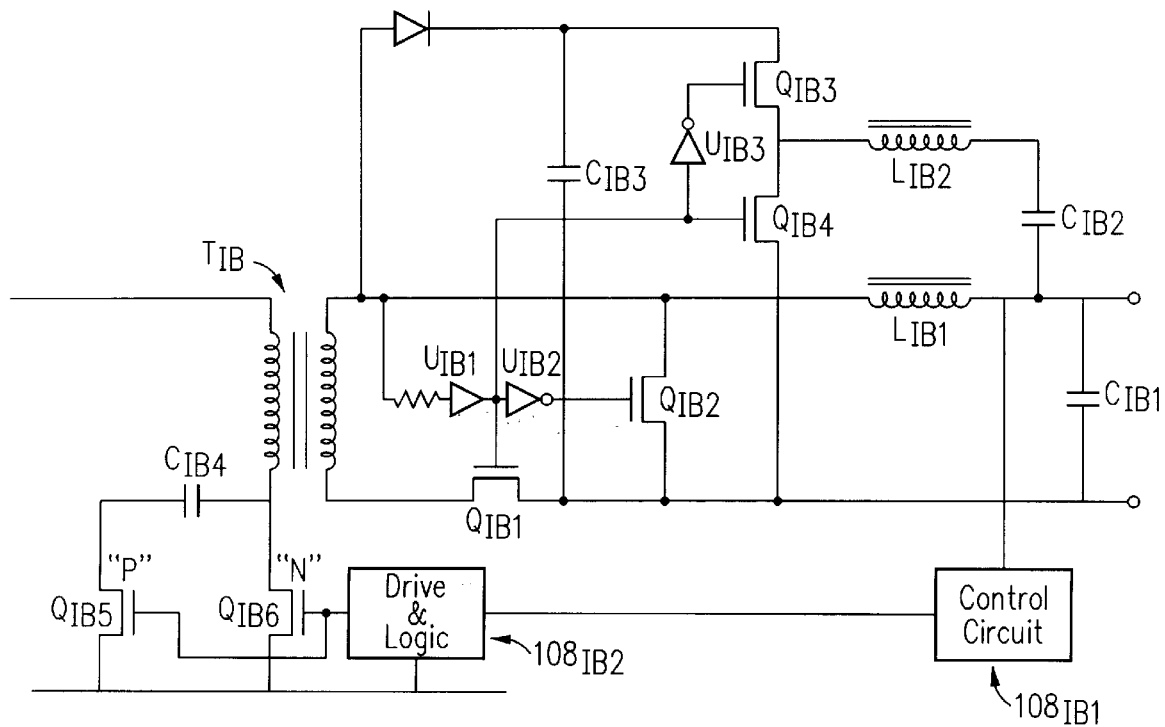
FIG. 5 shows the invention implemented as an isolated converter using a transformer and feedback control for fast response in accordance with the present invention.

Main circuit 102 is coupled to output terminals 110a, 110b and has a single stage output filter 107, including an inductor L1 and a capacitor C1. Alternatively FETs $Q_{IB1}$ and $Q_{IB2}$ may be connected as synchronous rectifiers on the secondary side of a buck converter transformer as shown in FIG. 5.

A feedback control circuit, which is shown as "control circuit" block 108, controls FETs Q1 and Q2 to alternately turn on and off at a rapid rate. The on/off duty cycle of FETs Q1 and Q2 are controlled to maintain the desired output voltage $V_{OUT}$ across output terminals 110a, 110b. Feedback control circuit 108 may pulse-width modulate the on/off times of FETs Q1 and Q2 at constant frequency, or may frequency-rate modulate them at constant on or off times, for example, to achieve the desired voltage. The inputs to feedback control circuit 108 can be the output voltage, the output current or any other states of the system. These techniques for controlling FETs Q1 and Q2 are well known in the art.

FETs Q1 and Q2 are driven alternately due to logic inverter U1, such that either one or the other is on at any given time, but both are never on simultaneously. In practice, a short turn on delay for each FET is employed to ensure that there is no cross conduction. This short turn on delay for each FET may be accomplished with a drive overlap prevention circuit, which is understood in the art and needs no further explanation. If FET Q1 is a P channel FET and FET Q2 is an N channel FET, or vice versa, a logic device for inverting the signal, such as logic inverter U1, is unnecessary because the turn on will alternate by the nature of the FETs.

Auxiliary circuit 104 has a set of chopper FETs Q3 and Q4, which serve as ripple cancellation choppers, and an auxiliary filter 111, including an inductor L2 and a capacitor C2. As in the case of Q1 and Q2, FETs Q3 and Q4 are driven alternately due to inverter U2. In accordance with FIG. 5, a buck converter transformer with FETs $Q_{IB3}$ and $Q_{IB4}$ as synchronous rectifiers may be used on the secondary side. In addition, as described above for FETs Q1 and Q2, FETs Q3 and Q4 may use P and N channel FETs to avoid using logic device U2.

The capacitor C2 is connected such that the ripple current flowing through it also flows through capacitor C1. Because control circuit 108 drives FETs Q3 and Q4 out of phase with FETs Q1 and Q2, the ripple currents in C1 cancel. Inductor L2 has the same inductance as inductor L1, and a simple calculation, well known to those skilled in the art, will show that the magnitudes of the main and auxiliary ripple currents are equal. Capacitor C2 need not have the same capacitance as capacitor C1 for the ripple currents to be equal.

Figure 4:
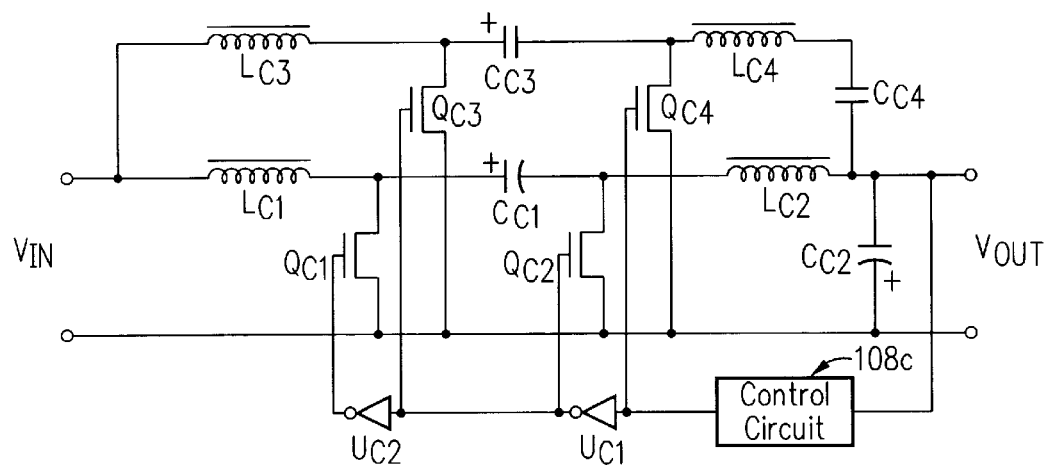
FIG. 4 is a circuit diagram of a Cuk switching regulator with synchronous rectification and output ripple cancellation in accordance with the present invention.

The ripple canceling concept of this invention could also be extended to other converter topologies that have continuous conduction output inductor current such as a Cuk regulator, as shown in FIG. 4, or an isolated buck converter as shown in FIG. 5, particularly when synchronous rectification is used. The Cuk regulator with ripple cancellation in accordance with the present invention, as shown in FIG. 4, uses four inductors $L_{C1}$ through $L_{C4}$; four capacitors $C_{C1}$, through $C_{C4}$; and a feedback control unit $108_C$ which controls switches $Q_{C1}$ through $Q_{C4}$, where switches $Q_{C1}$ and $Q_{C4}$ are in phase with each other and switches $Q_{C2}$ and $Q_{C3}$ are also in phase with each other but out of phase with switches $Q_{C1}$ and $Q_{C4}$, as illustrated by logic devices $U_{C1}$ and $U_{C2}$.

An isolated buck converter with ripple cancellation in accordance with the present invention is shown in FIG. 5. The isolated buck converter uses two inductors $L_{IB1}$ and $L_{IB2}$, four capacitors $C_{IB1}$ through $C_{IB4}$, six switches $Q_{IB1}$ through $Q_{IB6}$, a transformer $T_{IB}$, a non-inverting buffer $U_{IB1}$, for clipping and level shifting the transformer $T_{IB}$ secondary voltage to drive levels appropriate for switches $Q_{IB1}$ through $Q_{IB4}$. A control circuit $108_{IB1}$ and drive and logic circuit $108_{IB2}$ control switches $Q_{IB5}$ and $Q_{IB6}$. Switches $Q_{IB5}$ and QIB6 are P channel and N channel FETs, respectively, so that the turn on will alternate by the nature of the FETs. In addition, switches $Q_{IB1}$ and $Q_{IB4}$ are in phase with each other and switches $Q_{IB2}$ and $Q_{IB3}$ are also in phase with each other but out of phase with switches $Q_{IB1}$ and $Q_{IB4}$, as illustrated by logic devices $U_{IB2}$ and $U_{IB3}$.

Table 1 below sets forth component values in accordance with a specific embodiment of the non-isolated converter shown in FIG. 3 wherein $V_{IN}$ is 5 Volts DC, $V_{OUT}$ is 3 Volts DC, and the fixed chopping frequency is at 1 MHz.

TABLE 1

| COMPONENT | VALUE/TYPE |
| --- | --- |
| Capacitor C1 | 10 µF |
| Inductor L1 | 130 nH |
| Capacitor C2 | 10 µF |
| Inductor L2 | 130 nH |
| FET Q1 | 2 IRF 7421 D1s in parallel |
| FET Q2 | 2 IRF 7421 D1s in parallel |
| FET Q3 | IRF 7421 D1 |
| FET Q4 | IRF 7421 D1 |

Figure 6:
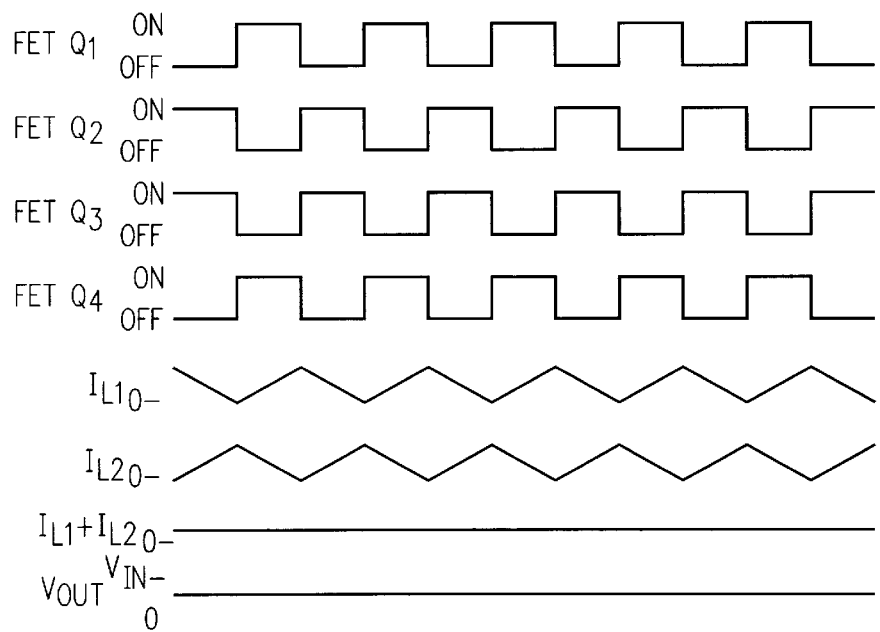
FIG. 6 is a waveform diagram illustrating operation of the switch mode voltage regulator of FIG. 3 in accordance with the present invention.

FIG. 6 is a waveform diagram illustrating the corresponding voltage and current waveforms. As illustrated, when FET Q1 is turned on, FET Q2 is turned off. During that time a voltage $V_{IN}-V_{OUT}$ is applied across inductor L1, which causes the ripple current $I_{L1}$ flowing through inductor L1, to increase linearly. When FET Q1 is off and FET Q2 is on, the voltage across inductor L1 is $-V_{OUT}$ which causes ripple current $I_{L1}$ through inductor L1 to decrease linearly. Because FETs Q3 and Q4 are inversely driven with respect to FETs Q1 and Q2, the ripple current $I_{L2}$ in inductor L2 is out of phase with current $I_{L1}$ flowing through inductor L1, as shown in FIG. 6. Ripple current $I_{L2}$ through inductor L2 flows through capacitor C2, and is added to ripple current $I_{L1}$ of inductor L1. The sum of the ripple currents $I_{L1}$ and $I_{L2}$ then flow through capacitor C1. Because FETs Q3 and Q4 are driven inversely with FETs Q1 and Q2, the ripple currents $I_{L1}$ and $I_{L2}$ essentially cancel to the extent that the duty cycles of FETs Q1 and Q2 are identical with the duty cycles of FETs Q4 and Q3, respectively, and inductor L1 is equal to inductor L2. Therefore, no ripple current flows into capacitor C1 or to the load. Accordingly, as shown in FIG. 6, $V_{OUT}$ is produced with no ripple.

Thus, regulator 100 efficiently minimizes output ripple under static load conditions. However, when there are changes in the load conditions on regulator 100, there could be a slow transient response unless the method of operation changes. If, for example, there is an increase in the load on regulator 100, the duty cycle of FET Q1 would be increased by feedback control circuit 108 to raise current $I_{L1}$ flowing through inductor L1, however, there would also be a corresponding increase in the duty cycle of FET Q4, which lowers current $I_{L2}$ through inductor L2 at the same rate. Thus, initially the net current flowing into capacitor C1 will remain the same and the voltage on capacitor C1 will begin to decrease due to the increase in load current. This condition would persist until the voltage on capacitor C2 changes significantly and the current cancellation is no longer effective. The time for this process may be decreased by lowering the value of capacitor C2, however, too low a value for capacitor C2 will cause incomplete ripple cancellation.

Boosting the Dynamic Response to Load Changes

Figure 7:
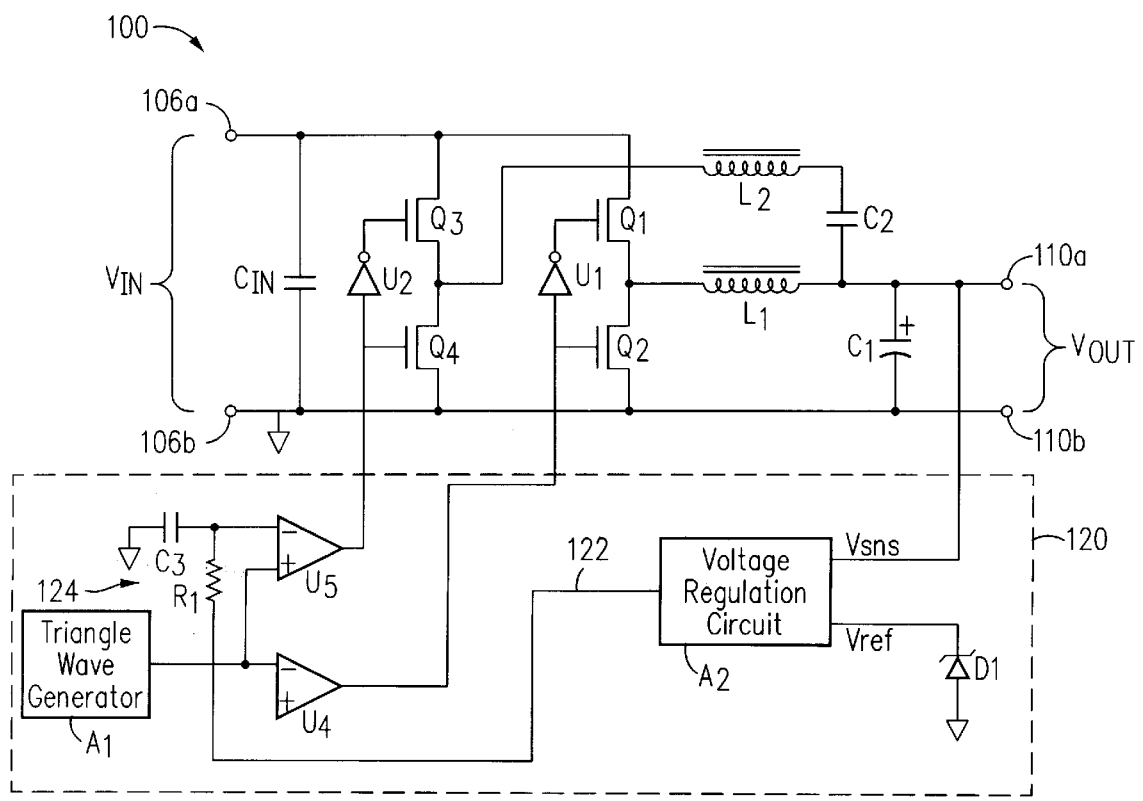
FIG. 7 is a circuit diagram of a switch mode voltage regulator with synchronous rectification and output ripple cancellation and a feedback control circuit for fast response for load changes in accordance with the present invention.

FIG. 7 is a circuit diagram of an embodiment of switch mode step-down voltage regulator 100 with a feedback control circuit 120 that improves the dynamic response to load changes. Although a "voltage mode" feedback control scheme is shown, one skilled in the art will understand that a "current mode" of feedback control may also be used. Feedback control circuit 120 includes a triangle or sawtooth wave generator A1; a voltage regulation circuit A2, which receives an output sensed voltage, $V_{SNS}$, and a reference voltage $V_{REF}$, shown schematically as Zener diode D1. Feedback control circuit 120 generates a control signal 122 that is applied to a comparator U4, which drives FETs Q1 and Q2, and is also applied to a time-delay circuit 124, which is in turn connected to comparator U5, which drives FETs Q3 and Q4. In the voltage mode, control signal 122 is a control voltage and triangle or sawtooth wave generator A1 generates a voltage waveform. In the current mode, feedback control circuit 120 includes a triangle or sawtooth wave generator A1 which generates a current waveform and a current regulation circuit which replaces voltage regulation circuit A2 and generates a control signal 122 in the form of a control current.

A triangle wave from generator A1 is fed into the negative input lead of comparator U4, while control signal 122 from voltage regulation circuit A2 is connected to the positive input lead of comparator U4. When the triangle wave at the negative input lead of comparator U4 is lower than control signal 122 at the positive input lead, the output signal of comparator U4 is HIGH, which turns off FET Q1 and turns on FET Q2. When control signal 122 at the positive input lead is lower than the triangle wave at the negative input lead, the output signal of comparator U4 is LOW turning on FET Q1 and turning off FET Q2. Accordingly, voltage regulation circuit A2 adjusts control signal 122 to maintain the proper main chopper duty cycle to produce the desired output voltage $V_{OUT}$ at terminals 110a, 110b.

The auxiliary chopper FETs Q3 and Q4 are driven by a second comparator U5. Triangle wave generator A1 is connected to the positive input lead of comparator U5. Control signal 122 is passed through time-delay circuit 124, which includes resistor R1 and capacitor C3. The time-delayed control signal 125 is connected to the negative input lead of comparator U5. The time delay for circuit 124 is proportional to the value of resistor R1 multiplied by the value of capacitor C3. The minimum time delay of circuit 124 is dependent upon the speed of feedback control circuit A2 and the response time of the main circuit 102, and may be as low as two to three switching periods if the feedback is fast or ten or more switching periods if the feedback is slower.

Figure 11A:
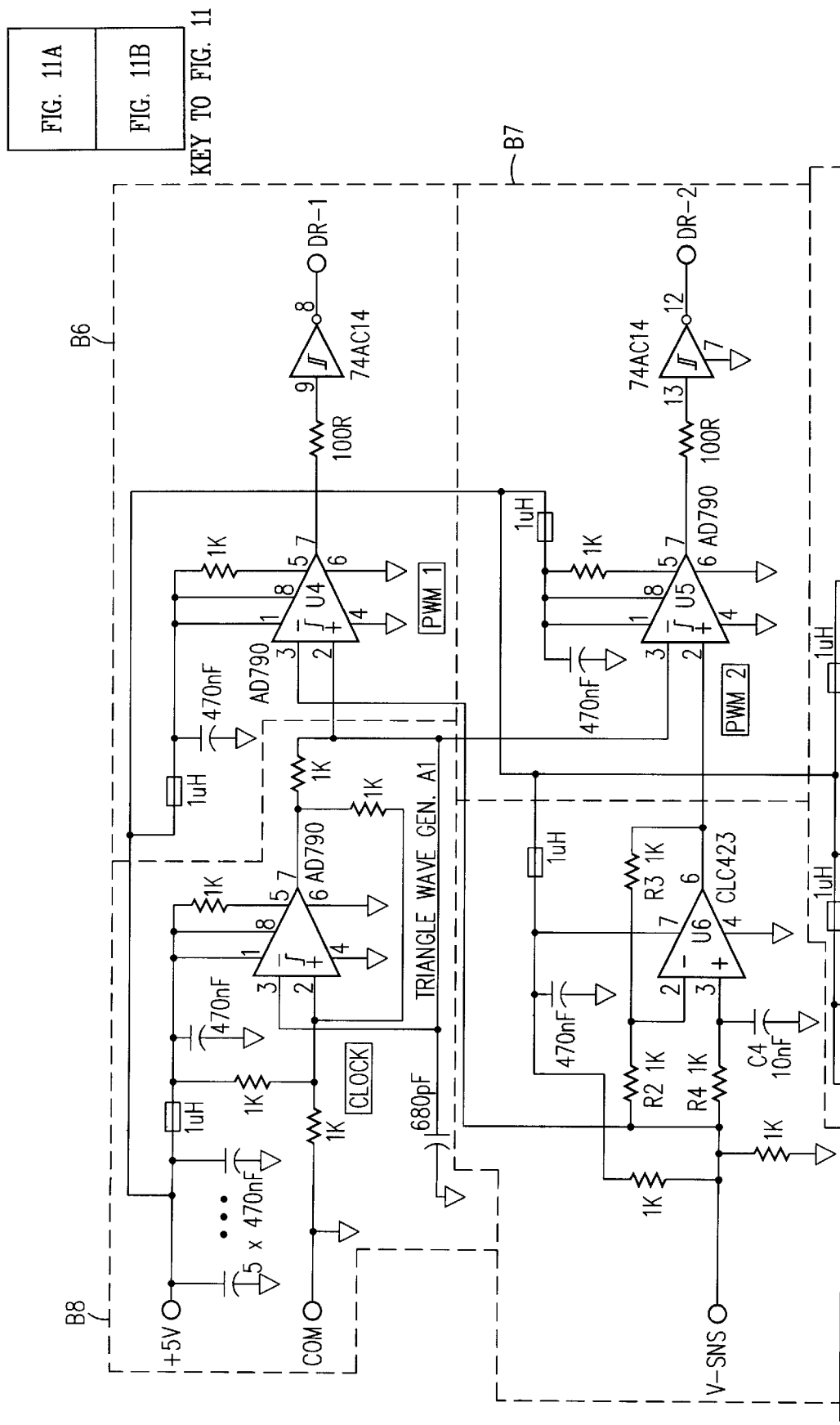
Figure 11B:
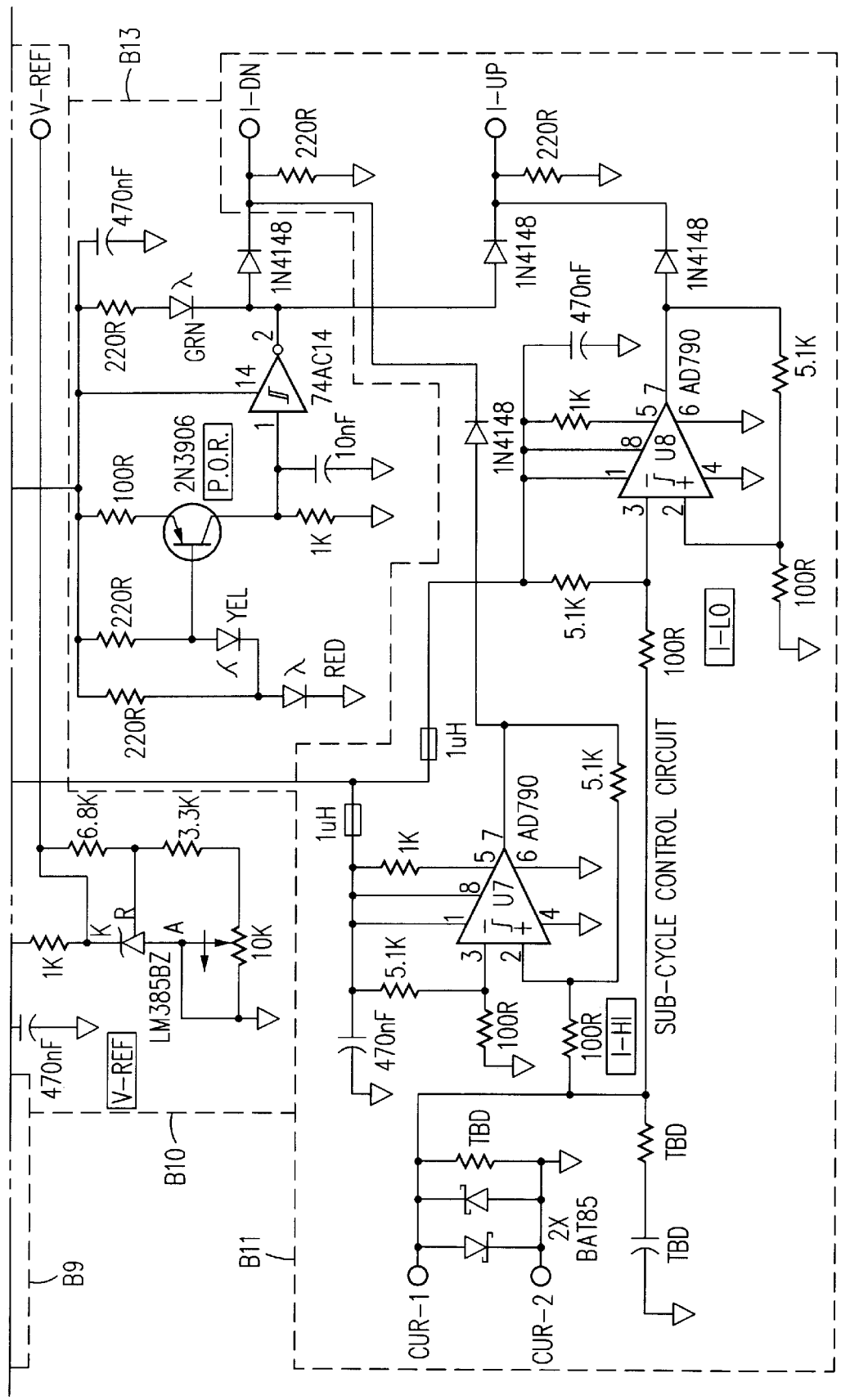

In one embodiment, a feedback control circuit 120 in accordance with the present invention has the following characteristics: resistor R1 in time-delay circuit 124 has a value of 1000 ohms, capacitor C3 has a value of 10 nF, triangle wave generator A1, comparator U4 and comparator U5 use comparator model No. AD790 manufactured by Analog Devices. Merely by way of example, one embodiment of an appropriate voltage regulation circuit is shown in FIGS. 10 and 11. Other voltage regulation circuits could also be used that compare a reference voltage with a sensed voltage and produce a control signal.

During steady state conditions, time-delayed control signal 125 at the negative input lead of comparator U5 is equal to control signal 122 at the positive input lead of comparator U4. Thus, the duty cycle of auxiliary chopper FETs Q3 and Q4 is opposite to the duty cycle of main chopper FETs Q1 and Q2.

When control signal 122 from voltage regulation circuit A2 changes due to a load change on regulator 100, time-delayed control signal 125 on the negative input lead of comparator U5 does not change immediately because of circuit 124. Thus, the duty cycle of the main chopper FETs Q1 and Q2 can change without a corresponding change in the duty cycle of the auxiliary chopper FETs Q3 and Q4, and this prevents the auxiliary converter from interfering with the change of average current in L1. The R1-C3 time constant must be sufficiently greater than the transient response time for main circuit 102 shown in FIG. 3 using control unit 120.

Improving the Dynamic Response to Load Changes

Figure 8:
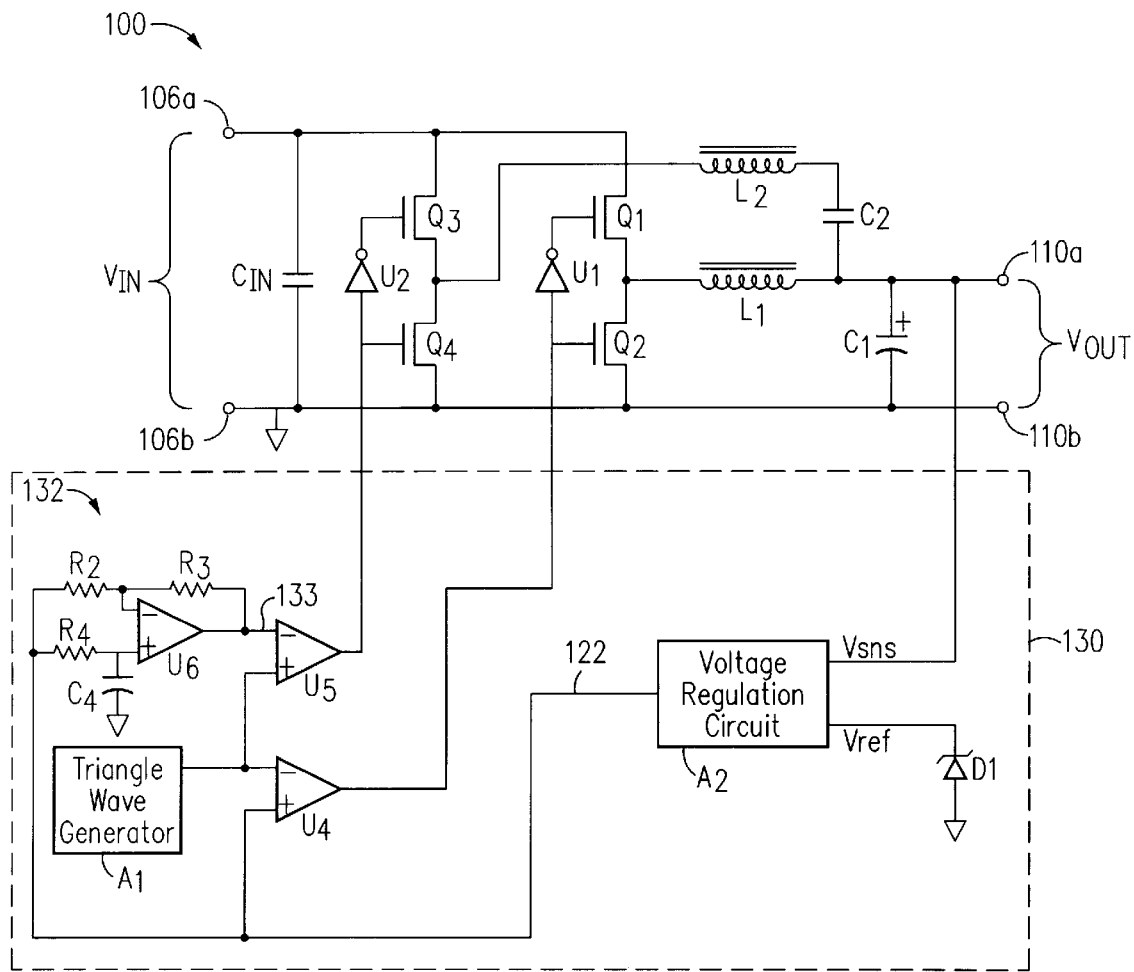
FIG. 8 is a circuit diagram of a switch mode voltage regulator with synchronous rectification and output ripple cancellation and another embodiment of a feedback control circuit for fast response for load changes in accordance with the present invention.

FIG. 8 is a circuit diagram of an embodiment that may be used to improve the dynamic response of regulator 100 by a factor of 2 to 1 by using a feedback control circuit 130 that dynamically changes the duty cycle of auxiliary chopper FETs Q3 and Q4 to be in phase with the duty cycle of main chopper FETs Q1 and Q2. In other words, the conduction duty cycle of FET Q3 is increased by the same amount that the conduction duty cycle of FET Q1 is increased, and the duty cycle of FET Q3 is decreased by the same amount that the duty cycle of FET Q1 is decreased. Under these conditions the currents of L1 and L2 will combine to increase the rate of rise of current to the load.

Control circuit 130 is similar to control circuit 120 in the above embodiment except that the negative input lead of comparator U5 is coupled to an all-pass time delay circuit 132 through which control signal 122 is passed. Any change in control signal 122 will initially be inverted by all-pass time delay circuit 132, but after a time delay determined by an RC time constant all-pass time delay circuit 132 will produce a signal that is equal to control signal 122. During the period that the signal is inverted, the main and auxiliary choppers will operate in phase. Again, a "voltage mode" feedback control scheme is shown, however, one skilled in the art will understand that a "current mode" of feedback control may also be used.

All-pass time delay circuit 132 consists of an op-amp U6; resistors R2, R3, and R4; and capacitor C4. Control signal 122 from voltage regulation circuit A2 passes through a time delay sub-circuit consisting of resistor R4 and capacitor C4 and is fed to the positive input lead of op-amp U6. The R4-C4 time constant may be approximately the same as the R1-C3 time constant of time-delay circuit 124 in the above embodiment. Op-amp U6 is coupled to feedback setting resistors R2 and R3, which typically have equal values. All-pass time delay circuit 132 produces a processed control signal 133 that is fed to the negative input lead of comparator U5.

In one embodiment, feedback control circuit 130 in accordance with the present invention is similar to control circuit 120 in the above embodiment with the addition of resistors R2 and R3 each having a value of 1000 ohms, resistor R4 having value of 1000 ohms, capacitor C4 having a value of 10 nF, and inverting amplifier U6 being model No. CLC423 manufactured by National Semiconductor, Inc.

Under steady state conditions the processed control signal 133 at the negative input lead of comparator U5 is equal to control signal 122 at the positive input lead to comparator U4. However, when there is a load change on regulator 100, control signal 122 of voltage regulation circuit A2 will change. When control signal 122 changes, the processed control signal 133 at the negative input lead of comparator U5 does not remain constant, as in the embodiment described above, but initially inverts the change in control signal 122. Comparator U5 will then produce an output duty cycle change that is in the phase the duty cycle produced by comparator U4. The processed control signal 133 decays over a time defined by the R4-C4 time constant until processed control signal 133 is again equal to the control signal 122, at which time comparator U5 will produce a duty cycle output signal that is opposite of the duty cycle produced by comparator U4.

When regulator 100 is under increasing load conditions, the conduction duration of FET Q1 will increase, which increases the current through inductor L1. Because of all-pass time delay circuit 132, the conduction duration of FET Q3 also increases, which increases the current through inductor L2. Thus, the increase in current through inductor L1 plus the increase in current through inductor L2 flows into capacitor C1 and the current change in to capacitor C1 will be twice as great as the change achieved with the above embodiment illustrated in FIG. 7, thereby increasing the response to load changes.

Sub-Cycle Control Circuit

Figure 9:
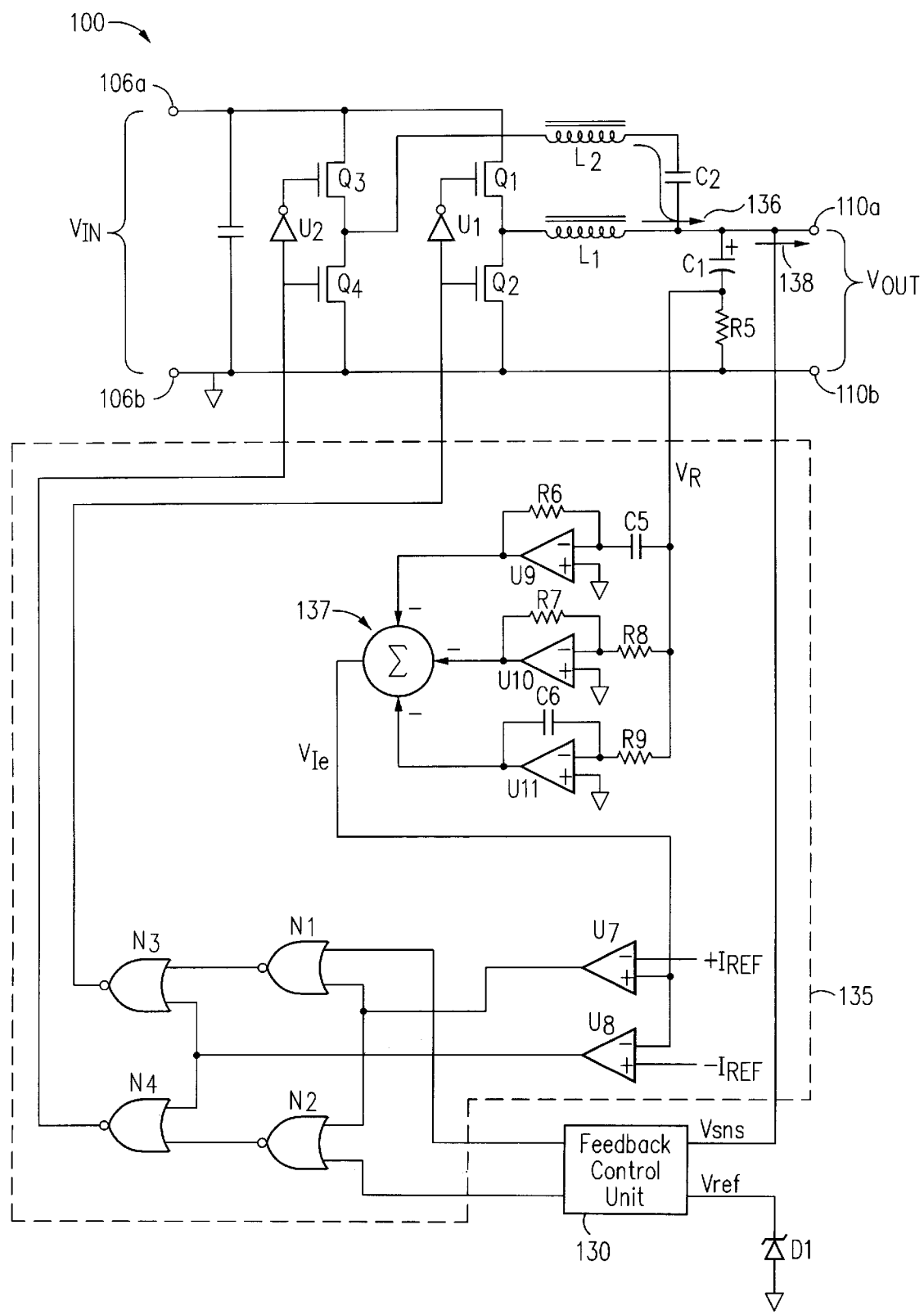
FIG. 9 is a circuit diagram of a switch mode voltage regulator with synchronous rectification and output ripple cancellation and a feedback control circuit for fast response for load changes and with a sub-cycle control circuit in accordance with the present invention.
Figure 10A:
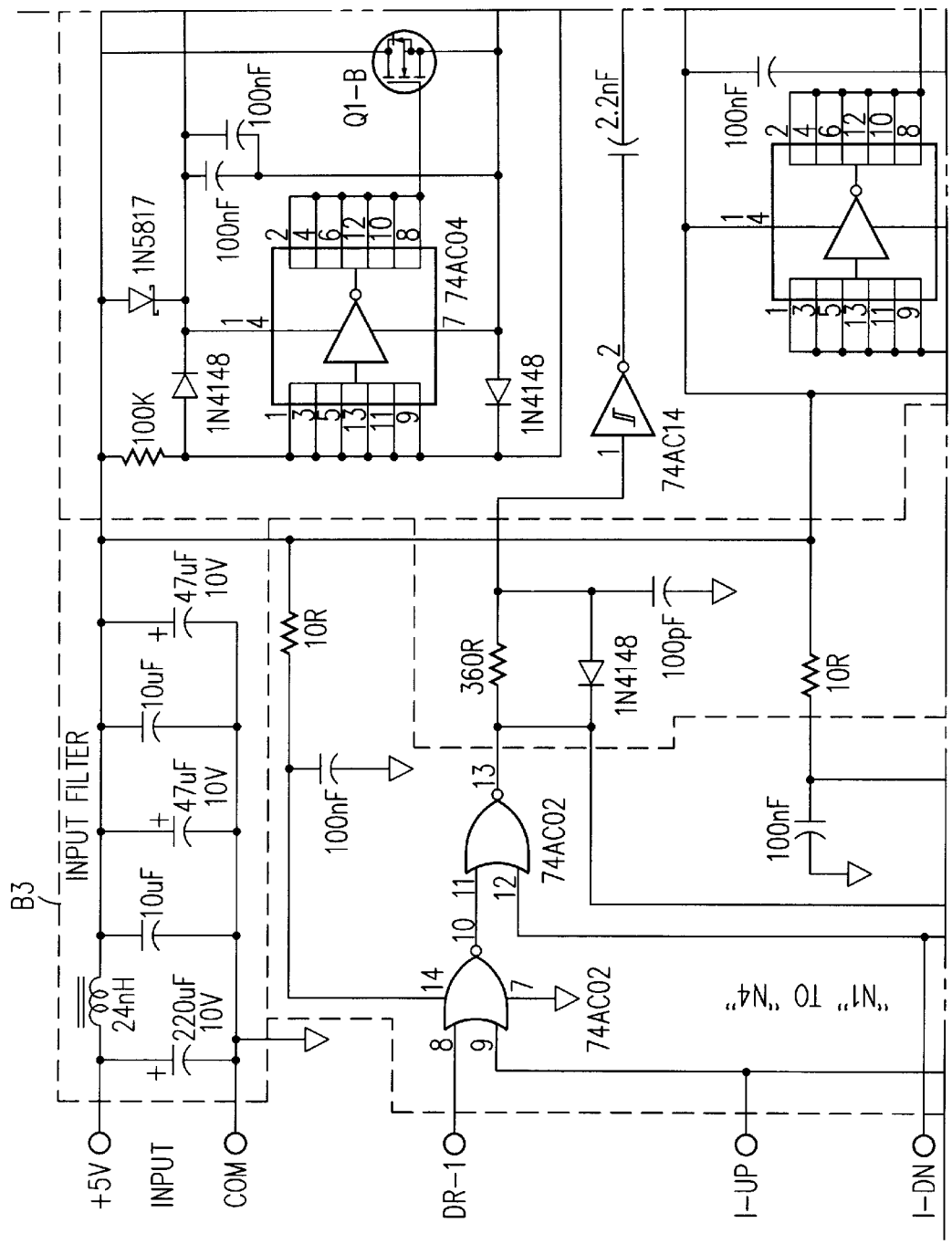
FIGS. 10 and 11 are detailed circuit diagrams of a specific embodiment of a switch mode voltage regulator with synchronous rectification and output ripple cancellation using a feedback control circuit for fast response for load changes and with a sub-cycle control circuit in accordance with the present invention.
Figure 10B:
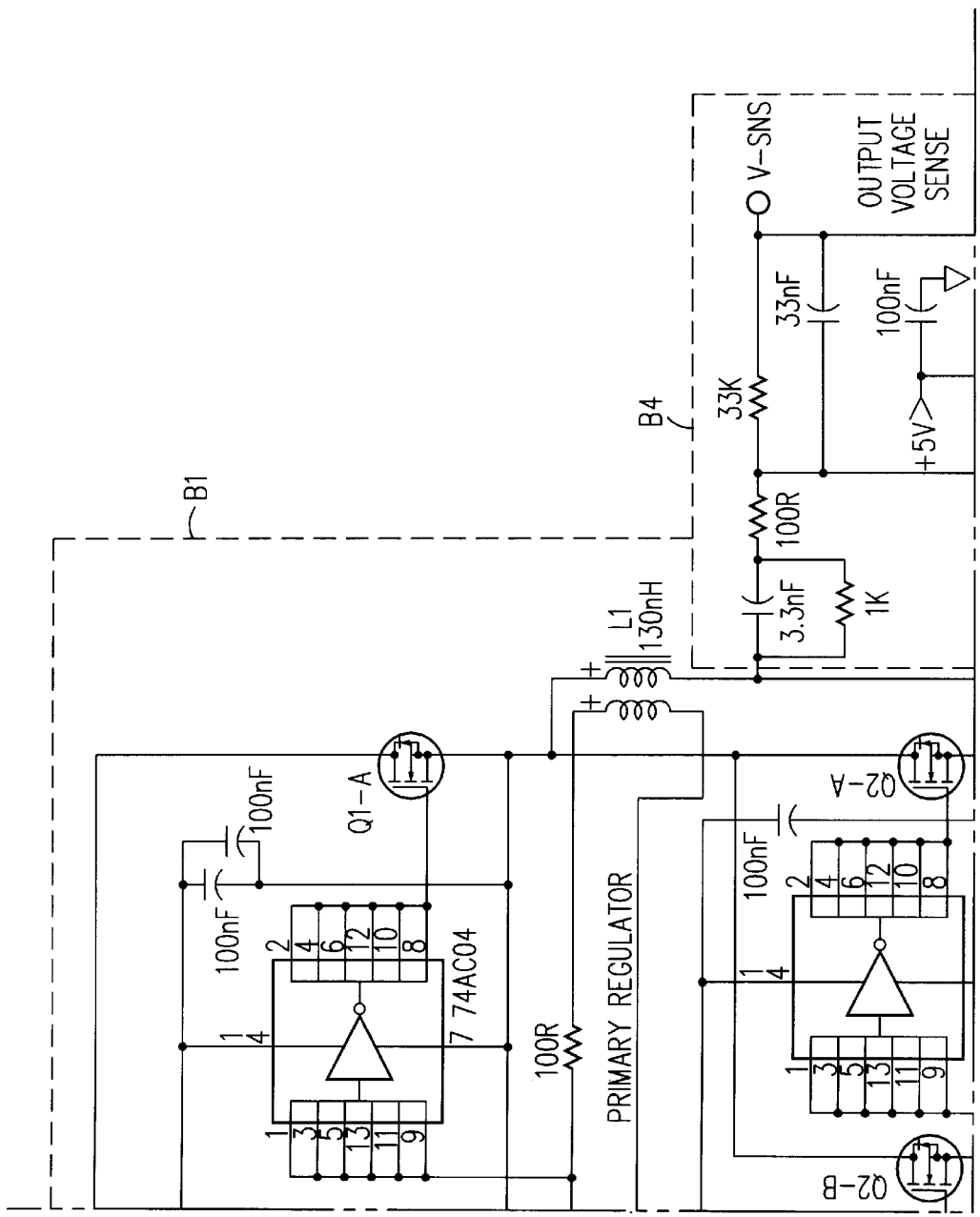
Figure 10C:
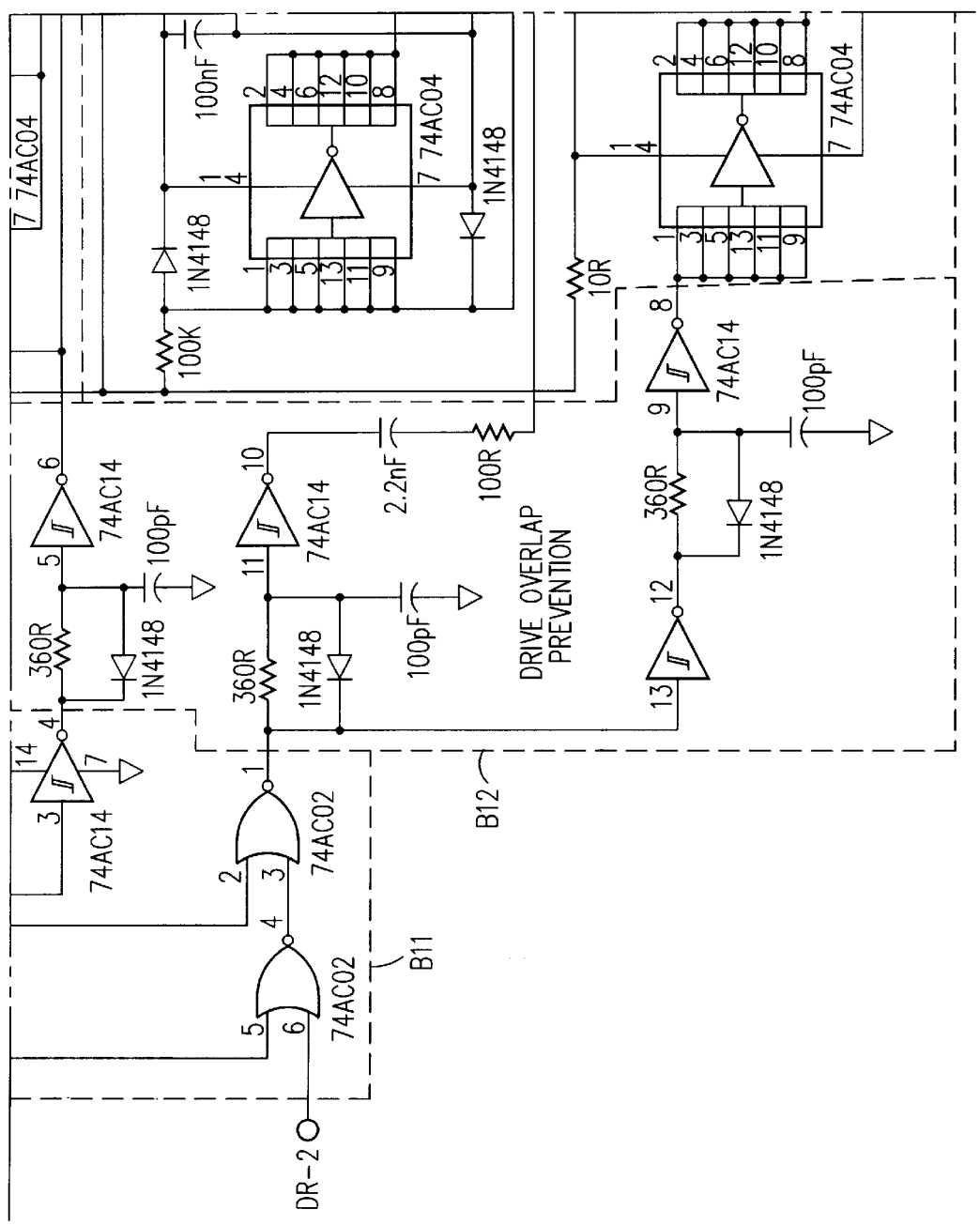
Figure 10D:
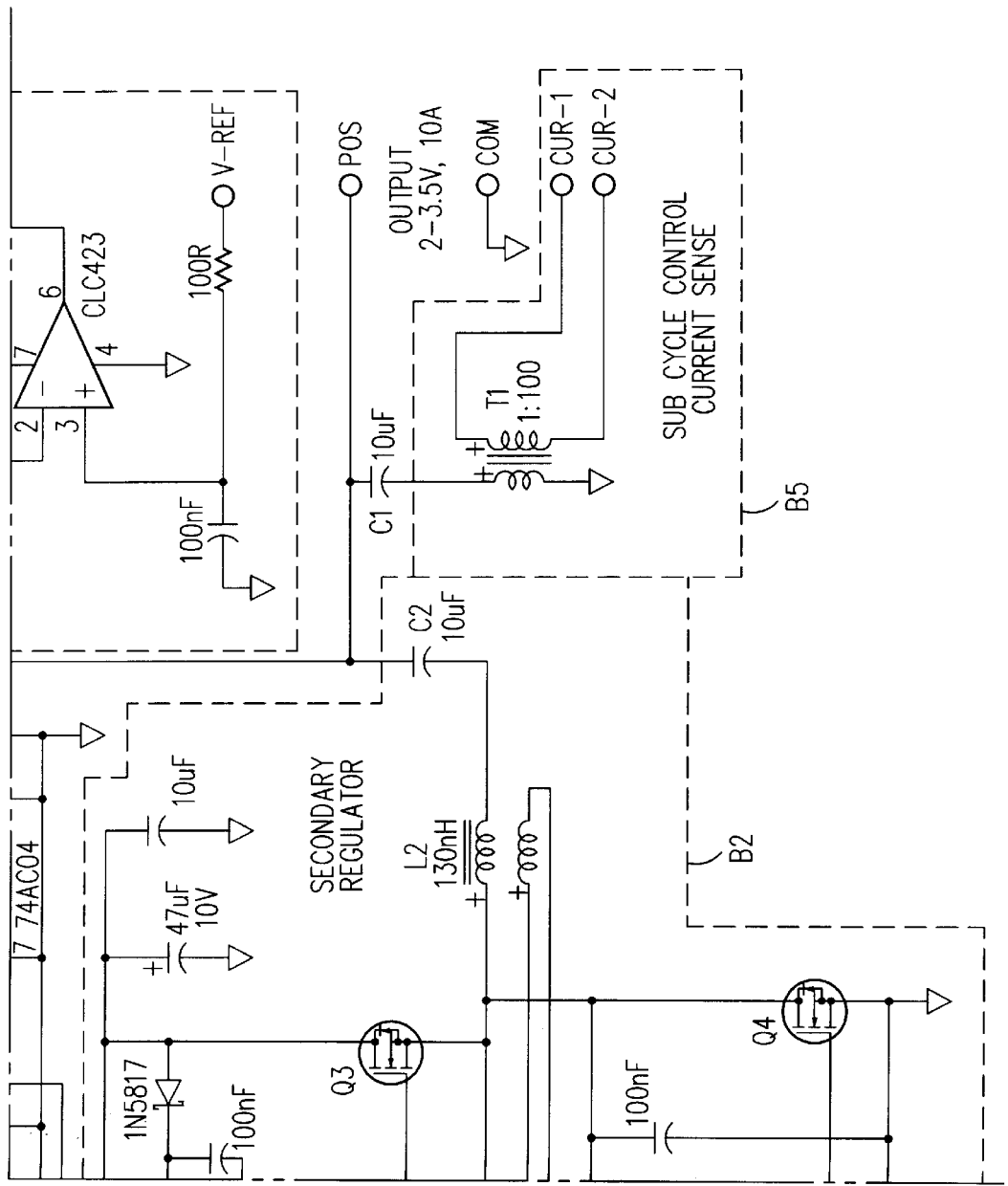

Another embodiment as illustrated in FIG. 9 improves the dynamic response to load changes on regulator 100 through sub-cycle control of feedback control circuit 130. A sub-cycle control circuit reacts quickly to changes in load conditions and may override a feedback control circuit to obtain control over the regulator in less than one switching cycle. FIG. 9 is a simplified diagram of voltage regulator 100 using feedback control circuit 130 with a sub-cycle control circuit 135, which may override feedback control circuit 130. Sub-cycle control circuit 135 may also be used with other feedback control circuits, e.g., feedback control unit 120 described in the above embodiment.

Regulator 100 is modified by an output current error circuit which compares the output current 136 from regulator 100, which is the current flowing into capacitor C1, with the load current 138, which is the current flowing out of terminal 110a. For instance, an output current error circuit may be a low valued shunt resistor R5 in series with capacitor C1. Other methods of sensing the difference between output current 136 and load current 138 may also be used, such as current transformers or an air cored Rogowski coil. A Rogowski coil is constructed essentially like a current transformer, but with the secondary on a non-magnetic, non-conducting material core and with a very high secondary load impedance. The open circuit secondary voltage in a Rogowski coil is proportional to the rate of change of the current. See, Rogowski, W. and Steinhaus, W. (1912), "Die Messung der Magnetische Spannung," Arch. Electrotech 1, pp. 141–50.

The difference between output current 136 and load current 138 is called the current error, which is proportional to voltage $V_R$ across shunt resistor R5. The voltage $V_R$ is processed by the op-amp circuits of U9, U10 and U11 to obtain the derivative, proportional value, and integral of the current error respectively. The output signals from op-amp circuits U9, U10, and U11, which are the derivative, proportional value, and integral of the current error, respectively, are fed to a voltage summing circuit 137 which produces a weighted sum forming an output current error signal voltage $V_{Ie}$. Current error voltage $V_{Ie}$ is monitored by comparators U7 and U8, with voltage $V_{Ie}$ being fed into the positive input lead of comparator U7 and into the negative input lead of comparator U8. A current reference $+I_{REF}$ is fed into the negative input lead of comparator U7, while another current reference $-I_{REF}$ is fed into the positive input lead of comparator U8. Current references $+I_{REF}$ and $-I_{REF}$ are chosen such that both comparators U7 and U8 have output voltages that are LOW when the current through shunt resistor R5 is instantaneously near zero, i.e., output current 136 of regulator 100 and load current 138 are essentially identical.

The output signal of comparator U7 is fed to two NOR gates N1 and N2. The output signal from comparator U4 in feedback control circuit 130 as described in the above embodiment is also connected to NOR gate N1, while the output signal from comparator U5 is connected to NOR gate N2. The output terminal from NOR gate N1 is connected to NOR gate N3, while the output terminal of NOR gate N2 is connected to NOR gate N4. The output signal from comparator U8 is also fed to NOR gates N3 and N4. The output signal of NOR gate N3 controls main chopper FETs Q1 and Q2. Similarly, the output signal of N4 controls auxiliary chopper FETs Q3 and Q4. It is appreciated that a similar circuit may be designed by one skilled in the art using other logic gates, such as NAND gates, in place of NOR gates N1 through N4.

The principle of sub-cycle control is most simply illustrated by assuming that the voltage summing circuit 137 assigns a weight of zero to the integral from op-amp U11 and derivative from op-amp U9 of the current error; in other words, the voltage $V_{Ie}$ is proportional to the current error only. It is further assumed that resistors R7 and R8 of the proportional sensing op-amp U10 have the same value, such that the current error signal voltage $V_{Ie}$ is equal to the voltage $V_R$ on shunt resistor R5. The following explanation of sub-cycle circuit 135 will be based upon these assumptions for the sake of clarity.

When the current through shunt resistor R5 is instantaneously near zero, comparators U7 and U8 produce LOW output signals to the four NOR gates N1 through N4 and thus NOR gates N1 through N4 will allow drive command signals from comparators U4, U5 in feedback control circuit 130 to pass without modification. Accordingly, as long as feedback control circuit 130 regulates the output voltage of regulator 100 such that there is no significant current flowing into or out of capacitor C1 within a threshold dictated by current references $+I_{REF}$ and $-I_{REF}$, sub-cycle control circuit 135 remains inactive.

If load current 138, however, begins to decrease, excess output current 136 in regulator 100 will flow into capacitor C1 and resistor R5. If the voltage $V_{Ie}$, which is assumed to be equal to voltage $V_R$ across resistor R5, is greater than current reference $+I_{REF}$, the output signal of comparator U7 will go HIGH. The HIGH output signal of comparator U7 will drive the output signals of NOR gates N1 and N2 LOW. The output signal of comparator U8 will remain LOW because the voltage across resistor R5 is greater than current reference $-I_{REF}$. Thus, both signals on the input leads of NOR gates N3 and N4 are LOW and, accordingly, the output signals of NOR gates N3 and N4 are driven HIGH. Thus, sub-cycle control circuit 135 overrides feedback control circuit 130, turning FETs Q2 and Q4 both on and FETs Q1 and Q3 both off. With FETs Q2 and Q4 on and FETs Q1 and Q3 off, the currents in inductors L1 and L2 will ramp down at the maximum rate until output current 136 of regulator 100 is approximately the same as load current 138 within the thresholds dictated by current references $+I_{REF}$ and $-I_{REF}$. Once load current 138 is approximately the same as output current 136 of regulator 100, the output signal of comparator U7 will go LOW and control is returned to feedback control circuit 130.

Operation of sub-cycle control circuit 135 is similar if load current 138 increases suddenly compared to output current 136 of regulator 100. The voltage across resistor R5 will become negative and, once $V_{Ie}$, which is assumed to be equal to $V_R$, is less than $-I_{REF}$, the output signal of comparator U8 will go HIGH. At that point, the output signals of NOR gates N3 and N4 are driven LOW overriding feedback control circuit 130. This turns FETs Q1 and Q3 on and FETs Q2 and Q4 off, causing the currents in both inductors L1 and L2 to ramp up at the maximum rate until output current 136 of regulator 100 is again approximately equal to load current 138. At that time the output signal of comparator U8 goes LOW, and control is returned to feedback control circuit 130.

Adding a derivative term to the current error voltage $V_{Ie}$ causes the sub-cycle control to respond faster when the current error is changing rapidly, as the sum of the current error and the derivative of the current error will cross the $+I_{REF}$ or $-I_{REF}$ threshold sooner. Adding an integral term to the current error voltage $V_{Ie}$ prevents a gradual drift in the output voltage of regulator 100, which is caused by residual current error, until feedback control circuit 130 can respond to output voltage drift.

FIGS. 10 and 11 are detailed circuit diagrams of a specific embodiment of a switch mode voltage regulator with synchronous rectification and output ripple cancellation using a feedback control circuit for fast load response with a sub-cycle control circuit. FIG. 10 shows the main regulator in box B1, the auxiliary regulator in box B2, an input filter in box B3, output voltage sensor in box B4, and a sub-cycle control current sensor in box B5. FIG. 11 shows comparator U4 in box B6 and comparator U5 in box B7. FIG. 11 also shows a triangle wave generator in Box B8, an all-pass time delay circuit in box B9, a voltage reference in box B10, and a sub-cycle control circuit in box B11, part of which is in FIG. 10 as well. The NOR gates of the sub-cycle control circuit and their input signals shown in box B11 are inverted from what is shown in circuit 135 in FIG. 9. This inversion is necessary because of the inverters used in the drive overlap prevention circuit in box B12 in FIG. 10, as will be understood by one skilled in the art. The function of the sub-cycle control circuit in box B11, however, is the same as circuit 135 shown in FIG. 9. In addition, there are circuits shown in FIGS. 10 and 11 that are necessary for proper operation of the switch mode voltage regulator, but are beyond the scope of the invention, such as the drive overlap prevention circuit in box B12 in FIG. 10 and a "power on reset" for startup circuit in box B13 in FIG. 14. These circuits, however, will be understood by one skilled in the art, and need no further explanation.

Although specific embodiments have been described and illustrated to explain the present invention, the present invention is not limited thereto. Additional circuit components can be added to achieve additional functions including electromagnetic filtering. Some circuit components may be replaced with other components, for instance a diode may be used to replace the synchronous rectifier FETs. In addition, other switching devices, e.g., bipolar transistors or IGBTs may be used. Accordingly, various adaptations, modifications and combinations of the features of the specific embodiments can be practiced without departing from the scope of the invention as set forth in the following claims.

What is claimed is:

1. A circuit comprising:

a first switching circuit having a first input lead with a first voltage and a second input lead with a second voltage and an output terminal connected to a first node;

a first inductive element coupled between said first node and a second node;

a second switching circuit having a first input lead with a third voltage and a second input lead with a fourth voltage and an output terminal connected to a third node;

a second inductive element coupled between said third node and said second node, wherein ripple current through said first inductive element into said second node and ripple current through said second inductive element into said second node at least partially cancel each other out;

a first capacitor coupled between said first inductive element and said second inductive element: and a first output terminal coupled to said second node.

2. Circuit of claim 1 wherein the voltage at said second node is substantially a DC voltage.

3. Circuit of claim 1 further comprising a second capacitor coupled between said second node and a common node, said second voltage is provided by said common node, said fourth voltage is also provided by said common node, and said first voltage equals said third voltage.

4. Circuit of claim 1, wherein said first capacitor is coupled between said second inductive element and said second node.

5. Circuit of claim 1, wherein said first switching circuit comprises a first switch for coupling said first node to a first voltage source and a second switch for coupling said first node to said common node, said second switching circuit comprises a third switch for coupling said third node to said first voltage source and a fourth switch for coupling said third node to said common node, wherein said first and second switches are not on simultaneously and said third and fourth switches are not on simultaneously.

6. Circuit of claim 1 further comprising:

a wave generator having a wave generator output terminal and providing a signal waveform on said wave generator output terminal;

a first pulse modulating circuit comprising a first comparator for comparing said signal waveform at said wave generator output terminal and a control signal indicative of the voltage present on said circuit output terminal, said first switching circuit being controlled in response to an output signal provided by said first comparator;

a time delay circuit for receiving said control signal and providing a time delay output signal; and a second pulse modulating circuit comprising a second comparator for comparing said time delay output signal and said signal waveform at said wave generator output terminal, said second switching circuit being controlled in response to an output signal provided by said second comparator.

7. Circuit of claim 6, wherein said time delay circuit comprises:
   a first resistor having a first and second terminal, said first terminal of said first resistor receiving said control signal, said second terminal of said first resistor being coupled to said second pulse modulating circuit; and
   a third capacitor having a first terminal and a second terminal, said first terminal of said third capacitor being coupled to said second terminal of said first resistor, said second terminal of said third capacitor being coupled to a common node.

8. Circuit of claim 6, wherein said time delay output signal is constant when said control signal is constant, when said control signal changes in a direction, said time delay output signal changes in the opposite direction, said time delay output signal then decays in said direction as the change of said control signal.

9. Circuit of claim 6, wherein said time delay circuit comprises:
   a first operational amplifier having a first input lead, a second input lead, and an output terminal, said output terminal of said first operational amplifier providing an output signal to said second pulse modulating circuit;
   a first feedback setting resistor having a first and second terminal, said first feedback setting resistor receiving said control signal at said first terminal and said second terminal being coupled to said first input lead of said first operational amplifier;
   a second feedback setting resistor being coupled between said first input lead and said output terminal of said first operational amplifier; and
   a time delay sub-circuit having an input terminal and an output terminal, said sub-circuit receiving said control signal at said input terminal, said output terminal of said sub-circuit being coupled to said second input lead of said first operational amplifier.

10. Circuit of claim 9, wherein said time delay sub-circuit comprises:
    a third resistor having a first and second terminal, said first terminal of said third resistor receiving said control signal, said second terminal of said third resistor being coupled to said second input lead of said operational amplifier; and
    a fourth capacitor having a first terminal and a second terminal, said first terminal of said fourth capacitor being coupled to said second terminal of said third resistor, said second terminal of said fourth capacitor being coupled to a common node.

11. Circuit of claim 9 wherein said first feedback setting resistor and said second feedback setting resistor are of equal resistance.

12. Circuit of claim 6 wherein said control signal is a control voltage and said signal waveform is a voltage waveform.

13. Circuit of claim 6 wherein said control signal is a control current and said signal waveform is a current waveform.

14. Circuit of claim 6 further comprising a sub-cycle control circuit disposed between said first comparator and said first switching circuit and disposed between said second comparator and said second switching circuit, said sub-cycle control circuit receiving said output signal from said first comparator and said output signal from said second comparator, said sub-cycle control circuit also receiving an output current error signal equivalent to the difference between an output current produced by said first and second inductive elements and a load current at said first output terminal of said circuit, said sub-cycle control circuit controlling said first and second switching circuits by overriding said output signals from said first and second comparators when a change in said output current error signal occurs.

15. Circuit of claim 14 wherein said sub-cycle control circuit comprises:
    an output current error circuit having an output terminal, said current error circuit producing at said output terminal an output current error signal equivalent to the difference between the output current produced by said first and second inductive elements and a load current at said first output terminal of said circuit;
    a third comparator with a first input lead, a second input lead, and an output terminal, said first input lead of said third comparator being coupled to said output terminal of said output current error circuit, said second input lead of said third comparator being coupled to a first reference signal;
    a fourth comparator with a first input lead, a second input lead, and an output terminal, said first input lead of said fourth comparator being coupled to a second reference signal, said second input lead of said fourth comparator being coupled to said output terminal of said output current error circuit;
    a first logic gate having a first input lead, a second input lead, and an output terminal, said first input lead of said first logic gate receiving said output signal provided by said first comparator, said second input lead of said first logic gate being coupled to said output terminal of said third comparator;
    a second logic gate having a first input lead, a second input lead, and an output terminal, said first input lead of said second logic gate receiving said output signal provided by said second comparator, said second input lead of said second logic gate being coupled to said output terminal of said third comparator;
    a third logic gate having a first input lead, a second input lead, and an output terminal, said first input lead of said third logic gate being coupled to said output terminal of said first logic gate, said second input lead of said third logic gate being coupled to said output terminal of said fourth comparator, said output terminal of said third logic gate being coupled to said first switching circuit; and
    a fourth logic gate having a first input lead, a second input lead, and an output terminal, said first input lead of said fourth logic gate being coupled to said output terminal of said second logic gate, said second input lead of said fourth logic gate being coupled to said output terminal of said fourth comparator, said output terminal of said fourth logic gate being coupled to said second switching circuit.

16. Circuit of claim 15, said output current error circuit being a shunt resistor in series with a second capacitor coupled between said second node and a common node.

17. Circuit of claim 15, said output current error circuit being a current transformer in series with a second capacitor coupled between said second node and a common node.

18. Circuit of claim 15, said output current error circuit being an air cored Rogowski coil in series with a second capacitor coupled between said second node and a common node.

19. Circuit of claim 15, further comprising:
    a derivative circuit coupled to said output terminal of said output current error circuit, said derivative circuit producing a derivative value of said output current error signal;

a proportional circuit coupled to said output terminal of said output current error circuit, said proportional circuit producing a proportional value of said output current error signal;

a integral circuit coupled to said output terminal of said output current error circuit, said integral circuit producing an integral value of said output current error signal; and a summing circuit disposed between said derivative, proportional, and integral circuits and said third and fourth comparators, said summing circuit producing a weighted sum of said derivative, proportional, and integral values.

20. Circuit of claim 15, wherein said first, second, third, and fourth logic gates are NOR gates.

21. Circuit of claim 15, wherein said first, second, third, and fourth logic gates are NAND gates.

22. Circuit of claim 1, wherein said circuit is a DC to DC converter.

23. A method of producing a DC voltage comprising:

repeatedly applying first and second voltages to a first lead of an output filter having a first inductive element and a first capacitive element coupled in series, said output filter having a second lead;

repeatedly applying third and fourth voltages to a first lead of a second inductive element, said second inductive element having a second lead coupled to said second lead of said output filter; and wherein ripple current through said first inductive element and ripple current through said second inductive element at least partially cancel each other.

24. A method of producing a DC voltage, comprising:

turning on and off a first switching circuit such that when said first switching circuit is on, an unregulated voltage is applied across a first output filter comprising a first inductive element and a first capacitive element, said first output filter producing a DC voltage with a first output ripple;

turning on and off a second switching circuit such that when said second switching circuit is on an unregulated voltage is applied across a second output filter comprising a second inductive element and a second capacitive element, said second output filter being coupled to said first output filter, said second output filter producing a second output ripple; and controlling said first and second switching circuits such that said second switching circuit is on when said first switching circuit is off, and said second switching circuit is off when said first switching circuit is on, such that said second output ripple at least partially cancels said first output ripple.

25. Method of claim 24, wherein controlling said first and second switching circuits further comprises:

comparing said DC voltage output of said first output filter with a reference voltage at a voltage regulation circuit to obtain a control signal;

producing a reference wave;

comparing said control signal with said reference wave at a first comparator, said first switching circuit being controlled in response to an output signal provided by said first comparator;

placing said control signal through a time delay circuit to obtain a time delayed control signal; and comparing said time delayed control signal with said reference wave at a second comparator, said second switching circuit being controlled in response to an output signal provided by said first comparator.

26. Method of claim 24, wherein controlling said first and second switching circuits further comprises:

comparing said DC voltage output of said first output filter with a reference voltage at a voltage regulation circuit to obtain a control signal;

producing a reference wave;

comparing said control signal with said reference wave at a first comparator, said first switching circuit being controlled in response to an output signal provided by said first comparator;

placing said control signal through an all-pass time delay circuit to obtain a processed control signal; and comparing said processed control signal with said reference wave at a second comparator, said second switching circuit being controlled in response to an output signal provided by said first comparator.

27. Method of claim 25, wherein controlling said first and second switching circuits further comprises:

using a first signal indicative of the output current and a second signal indicative of a load current to obtain a current error signal;

determining a threshold value for the range of said current error signal;

overriding said output signal of said first comparator, comprising applying the output signal from said first comparator through means for sub-cycle control when said current error signal is greater than said threshold value; and overriding said output signal of said second comparator, comprising applying the output signal from said second comparator through means for sub-cycle control when said current error signal is less than said threshold value.

28. A circuit comprising:

a first switching circuit having a first input lead with a first input voltage, a second input lead with a second input voltage and an output terminal connected to a first node;

a first inductive element coupled between said first node and a second node;

a capacitor coupled to said second node;

a second switching circuit having a first input lead with a third input voltage, a second input lead with a fourth input voltage and an output terminal connected to a third node;

a second inductive element coupled between said third node and said second node, wherein ripple current through said first inductive element into said second node and ripple current through said second inductive element into said second node substantially cancel each other out; and a first output terminal coupled to said second node.

\* \* \* \* \*